(12) United States Patent
Aparin

(10) Patent No.: US 8,676,734 B2
(45) Date of Patent: Mar. 18, 2014

(54) METHODS AND SYSTEMS FOR REPLACEABLE SYNAPTIC WEIGHT STORAGE IN NEURO-PROCESSORS

(75) Inventor: Vladimir Aparin, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 351 days.

(21) Appl. No.: 12/831,484

(22) Filed: Jul. 7, 2010

(65) Prior Publication Data

US 2012/0011087 A1   Jan. 12, 2012

(51) Int. Cl.
*G06F 15/18* (2006.01)
*G06N 3/08* (2006.01)
*G06N 3/00* (2006.01)

(52) U.S. Cl.
USPC ............................................. 706/25; 706/43

(58) Field of Classification Search
USPC ....................................... 706/25, 43
See application file for complete search history.

(56) References Cited

U.S. PATENT DOCUMENTS

| | | | | |
|---|---|---|---|---|
| 5,274,743 A | * | 12/1993 | Imondi et al. | 706/25 |
| 5,278,945 A | * | 1/1994 | Basehore et al. | 706/41 |
| 5,299,286 A | * | 3/1994 | Imondi et al. | 706/37 |
| 5,329,611 A | * | 7/1994 | Pechanek et al. | 706/42 |
| 5,448,682 A | * | 9/1995 | Chung et al. | 706/33 |
| 5,450,528 A | * | 9/1995 | Chung et al. | 706/25 |
| 5,604,840 A | * | 2/1997 | Asai et al. | 706/10 |
| 5,717,832 A | * | 2/1998 | Steimle et al. | 706/33 |
| 7,814,038 B1 | * | 10/2010 | Repici | 706/25 |
| 7,904,398 B1 | * | 3/2011 | Repici | 706/15 |
| 2007/0288410 A1 | * | 12/2007 | Tomkins et al. | 706/42 |
| 2009/0240642 A1 | * | 9/2009 | Snook et al. | 706/27 |

FOREIGN PATENT DOCUMENTS

JP            04182769 A    *    6/1992

OTHER PUBLICATIONS

Janardan Misra and Indranil Saha; "Artificial neural networks in hardware: A survey of two decades of progress", Neurocomputing; vol. 74, Issues 1-3; Dec. 2010, pp. 239-255.*
Translation of Japanese Patent (JP 04182769 A).*

* cited by examiner

*Primary Examiner* — Jeffrey A Gaffin
*Assistant Examiner* — James F Sugent
(74) *Attorney, Agent, or Firm* — Rupit M. Patel

(57) ABSTRACT

Certain embodiments of the present disclosure support techniques for storing synaptic weights separately from a neuro-processor chip into a replaceable storage. The replaceable synaptic memory gives a unique functionality to the neuro-processor and improves its flexibility for supporting a large variety of applications. In addition, the replaceable synaptic storage can provide more choices for the type of memory used, and might decrease the area and implementation cost of the overall neuro-processor chip.

12 Claims, 4 Drawing Sheets

METHODS AND SYSTEMS FOR REPLACEABLE SYNAPTIC WEIGHT STORAGE IN NEURO-PROCESSORS

BACKGROUND

1. Field

Certain embodiments of the present disclosure generally relate to neural system engineering and, more particularly, to a method for storing synaptic weights separately from a neuro-processor chip into replaceable storage.

2. Background

Functionality of a neuro-processor depends on synaptic weights, which control strengths of connections between neurons. The synaptic weights are typically stored in non-volatile, on-chip memory in order to preserve the processor functionality after being powered down.

Having this memory on the same chip with the neuro-processor limits the neuro-processor functionality and flexibility. In addition, the on-chip synaptic memory limits choices for the type of non-volatile memory that can be utilized, as well as it increases the area and implementation cost of the overall chip.

SUMMARY

Certain embodiments of the present disclosure provide an electrical circuit. The electrical circuit generally includes a neuro-processor chip with a plurality of neuron circuits and synapses, wherein each synapse connects a pair of the neuron circuits, and a removable memory connected to the neuro-processor chip storing weights of the synapses, wherein the weights determine a function of the neuro-processor chip.

Certain embodiments of the present disclosure provide a method for implementing a neural system. The method generally includes using a removable memory to store weights of synapses, wherein each synapse connects two of a plurality of neuron circuits of a neuro-processor chip, and wherein the weights determine a function of the neuro-processor chip, and connecting the removable memory to the neuro-processor chip.

Certain embodiments of the present disclosure provide an apparatus for implementing a neural system. The apparatus generally includes means for using a removable memory to store weights of synapses, wherein each synapse connects two of a plurality of neuron circuits of a neuro-processor chip, and wherein the weights determine a function of the neuro-processor chip, and means for connecting the removable memory to the neuro-processor chip.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Various embodiments of the disclosure are described more fully hereinafter with reference to the accompanying drawings. This disclosure may, however, be embodied in many different forms and should not be construed as limited to any specific structure or function presented throughout this disclosure. Rather, these embodiments are provided so that this disclosure will be thorough and complete, and will fully convey the scope of the disclosure to those skilled in the art. Based on the teachings herein one skilled in the art should appreciate that the scope of the disclosure is intended to cover any embodiment of the disclosure disclosed herein, whether implemented independently of or combined with any other embodiment of the disclosure. For example, an apparatus may be implemented or a method may be practiced using any number of the embodiments set forth herein. In addition, the scope of the disclosure is intended to cover such an apparatus or method which is practiced using other structure, functionality, or structure and functionality in addition to or other than the various embodiments of the disclosure set forth herein. It should be understood that any embodiment of the disclosure disclosed herein may be embodied by one or more elements of a claim.

The word "exemplary" is used herein to mean "serving as an example, instance, or illustration." Any embodiment described herein as "exemplary" is not necessarily to be construed as preferred or advantageous over other embodiments.

Although particular embodiments are described herein, many variations and permutations of these embodiments fall within the scope of the disclosure. Although some benefits and advantages of the preferred embodiments are mentioned, the scope of the disclosure is not intended to be limited to particular benefits, uses or objectives. Rather, embodiments of the disclosure are intended to be broadly applicable to different technologies, system configurations, networks and protocols, some of which are illustrated by way of example in the figures and in the following description of the preferred embodiments. The detailed description and drawings are merely illustrative of the disclosure rather than limiting, the scope of the disclosure being defined by the appended claims and equivalents thereof.

Exemplary Neural System

Figure 1:
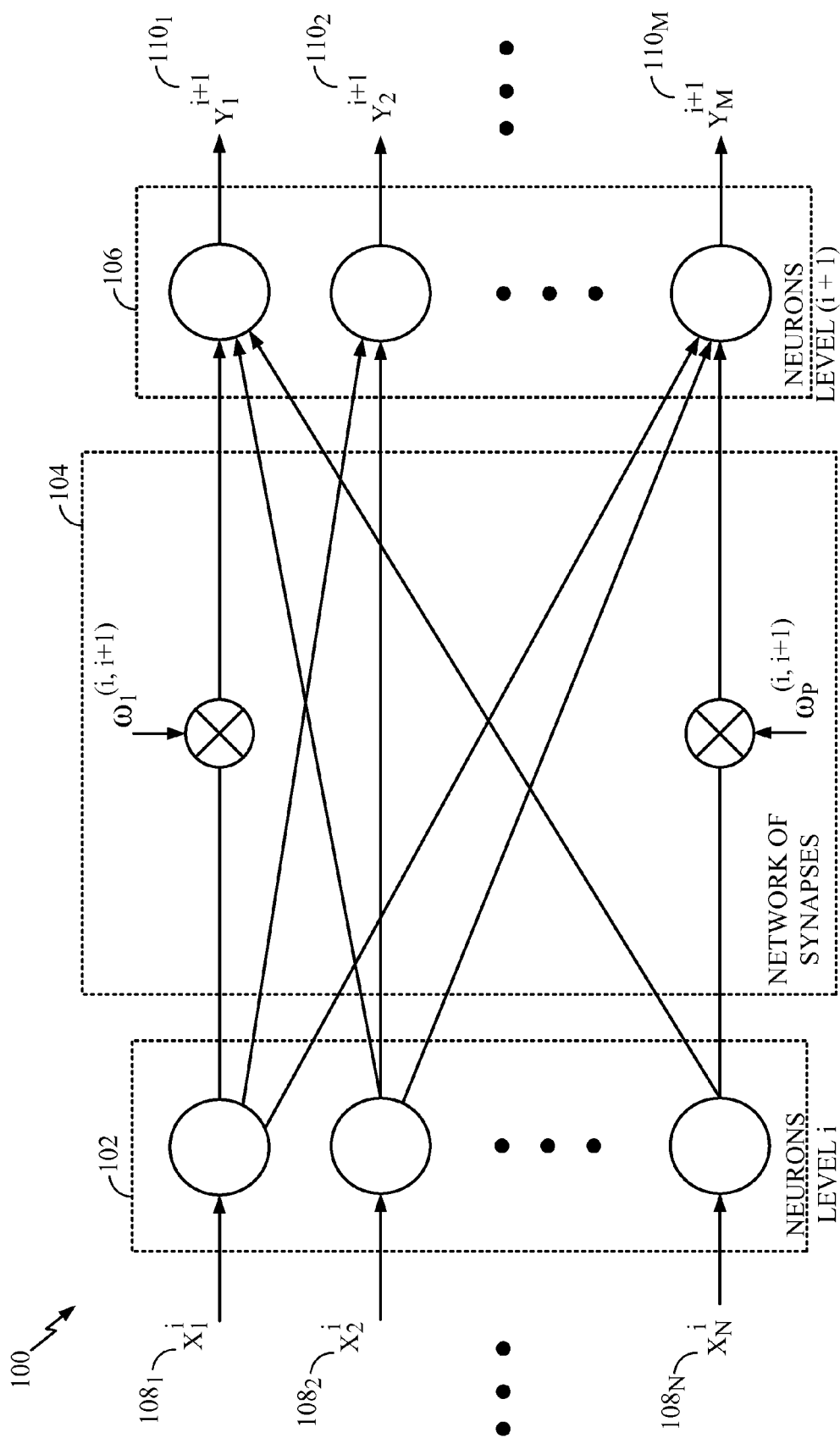
FIG. 1 illustrates an example neural system in accordance with certain embodiments of the present disclosure.

FIG. 1 illustrates an example neural system 100 with multiple levels of neurons in accordance with certain embodiments of the present disclosure. The neural system 100 may comprise a level of neurons 102 connected to another level of neurons 106 though a network of synapse connections 104. For simplicity, only two levels of neurons are illustrated in FIG. 1, although more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches its threshold level, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons, scale those signals according to adjustable synaptic weights $w_1^{(i,i+1)}, \ldots, w_P^{(i,i+1)}$ (where P is a total number of synaptic connections between the neurons of levels 102 and 106), and combine the scaled signals as input signals of the level 106 neurons. Every neuron in the level 106 may generate an output spike 110 based on the corresponding combined input signal. The output spikes 110 may be then transferred to another level of neurons using another network of synaptic connections (not shown in FIG. 1).

The neural system 100 may be emulated by a neuro-processor and utilized in a large range of applications, such as pattern recognition, machine learning and motor control. Each neuron of the neural system 100 may be implemented as a neuron circuit within the neuro-processor chip. The neuron membrane charged to the threshold level to initiate the output spike may be implemented within the neuron circuit as a capacitor which integrates an electrical current that flows through it. To substantially reduce the area of neuron circuit, a nanometer feature-sized memristor element may be utilized as the integrating device instead of the capacitor. By applying this approach, efficient implementation of the very large-scale neural system hardware may be possible.

Functionality of the neuro-processor that emulates the neural system 100 may depend on weights of synaptic connections, which may control strengths of connections between neurons. The synaptic weights may be stored in a non-volatile memory in order to preserve functionality of the processor after being powered down. However, having this memory on the same chip with the neuro-processor may limit the processor functionality and flexibility. In addition, the on-chip synaptic memory may limit choices for the type of non-volatile memory being utilized, and may increase the area and implementation cost of the overall chip.

Certain embodiments of the present disclosure support implementation of the synaptic weight memory on a separate external chip from the main neuro-processor chip. The synaptic weight memory may be packaged separately from the neuro-processor chip as a replaceable removable memory. This may provide diverse functionalities to the neuro-processor, wherein a particular functionality may be based on synaptic weights stored in a removable memory currently attached to the neuro-processor.

Exemplary Neuromorphic Architecture with External Synaptic Memory

Figure 2:
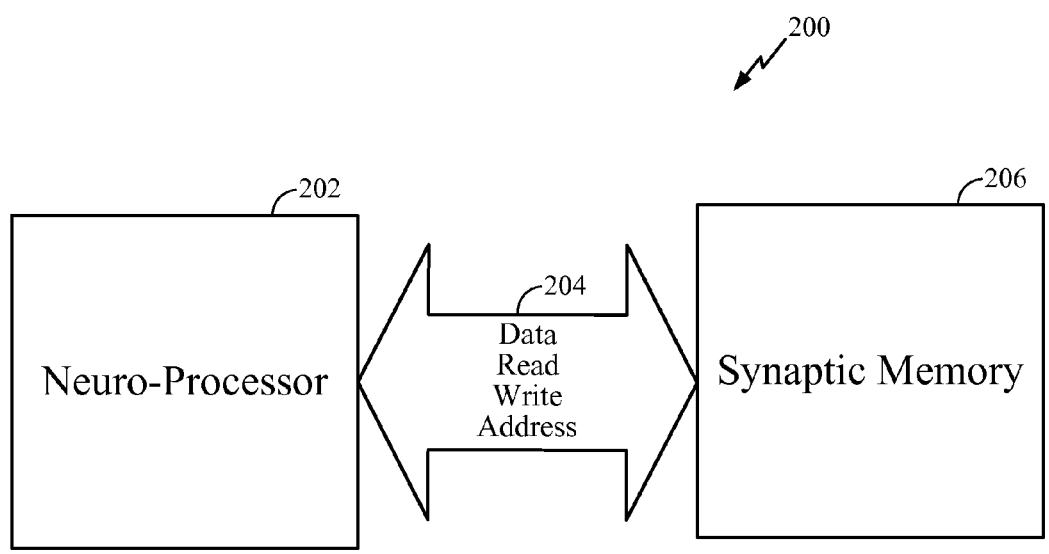
FIG. 2 illustrates an example of neuro-processor interfaced with an external synaptic weight memory in accordance with certain embodiments of the present disclosure.

FIG. 2 illustrates an example of neuromorphic architecture 200 in accordance with certain embodiments of the present disclosure. A synaptic memory 206 may be implemented as a separate and external removable memory, which may be connected to a neuro-processor 202 through an interface circuit 204. The neuro-processor 202 may emulate the neural system 100 illustrated in FIG. 1. It may comprise a large number of neuron circuits and synaptic connections. The interface 204 may comprise a bus connecting the neuro-processor chip 202 and the external synaptic removable memory 206. The interface bus may be designed to carry the synaptic weights data in both directions, as well as commands such as "memory write," "memory read," and "address."

For supporting neural system engineering applications, the neuro-processor 202 may typically comprise, for example, about 10,000 neuron circuits with about 100 synapses per neuron, which brings the total number of synapses in the neuro-processor 202 to approximately $10^6$. The strength of each synaptic connection may be associated with a weight represented with a certain number of bits according to a desired precision. Typically, up to ten bits may be required per synaptic weight to provide sufficient precision for a large variety of applications. If, for example, every weight is represented with ten bits, then the memory of approximately 10 Mbits may be required to store the synaptic weights for the neuro-processor with approximately $10^6$ synapses.

The number of neurons and synapses within a neuro-processor is expected to increase substantially in the near future for supporting even more complex neural system engineering applications. The required size of synaptic weight memory may be much larger than 10 Mbits. Implementation of the large synaptic memory as a removable memory external to the neuro-processor may provide more efficient die utilization of both the neuro-processor and the synaptic memory. In addition, fabrication processes of the neuro-processor and memory may be uniquely tailored to the needs of these separate chips in order to provide better performance and lower cost.

As aforementioned, functionality of the neuro-processor 202 may depend on weights of the synaptic connections between the neuron circuits. For the neuro-processor 202 to be able to perform a particular application, training of the synaptic weights may need first to be performed within the neuro-processor. During the training process, the synaptic weights may be stored and loaded to/from the external memory 206 through the interface 204. Once the learning process is finished, all trained synaptic weights may be fully stored into the external memory chip 206.

For many applications, duration of the weight-training process within the neuro-processor may last a long time. However, once the trained synaptic weights are fully stored in the external removable memory 206, they may be then quickly replicated to another removable memory. In this way, it may be possible to simply "clone" a functionality of the neuro-processor 202 from one memory chip to another. The time- and power-consuming weight-training process within another neuro-processor chip may be then fully avoided, and the other neuro-processor chip may be able to execute the same function as the neuro-processor 202 without performing the weight-training.

In one embodiment of the present disclosure, the external memory 206 may be implemented as a replaceable removable memory. The same neuro-processor 202 may have different functionalities depending on the synaptic removable memory attached to it. The replaceable removable memory may be shared between users, and a library of different functionalities (i.e., different weight values of same synapses) may be stored in different removable memories. These synaptic removable memories with diverse functionalities may be designed fully independently from the neuro-processor 202.

In another embodiment of the present disclosure, a local working memory with temporary data (e.g., with a portion of the synaptic weights) may be implemented within the neuro-processor chip 202 to provide faster processor operations. The local memory may be also utilized during the aforementioned weight-training process. On the other hand, a permanent memory comprising all trained synaptic weights fully determining the processor functionality may be external and implemented as the separate memory chip 206.

Figure 3:
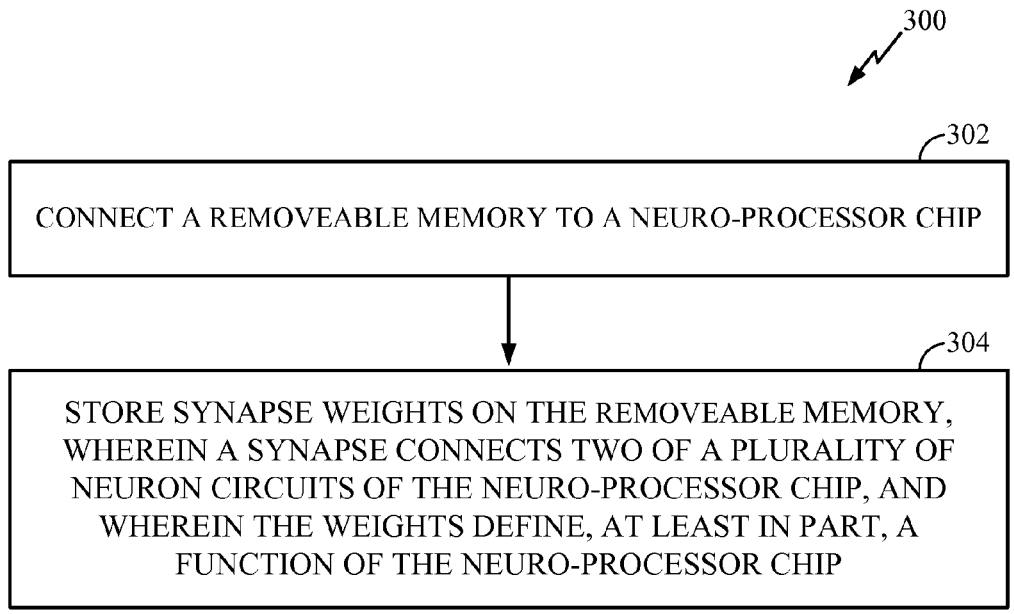
FIG. 3 illustrates example operations for implementing the synaptic weight memory external to the neuro-processor in accordance with certain embodiments of the present disclosure.

FIG. 3 illustrates example operations 300 for implementing a synaptic removable memory external to a neuro-processor chip in accordance with certain embodiments of the present disclosure. At 302, a removable memory may be connected to the neuro-processor chip. At 304, the removable memory may be used to store synapse weights, wherein each synapse may connect two of a plurality of neuron circuits of the neuro-processor chip, and wherein the weights may define, at least in part, a function of the neuro-processor chip.

Exemplary Implementation of Neuro-Processor and Synaptic Memory Chip

Implementation details related to the neuro-processor chip 202 and the external synaptic memory chip 206 are presented in the following text. The implementation estimates are based on the exemplary case when the neuro-processor 202 may comprise approximately $10^4$ neurons for supporting various today's neural system applications.

An implementation area of one neuron circuit may be in the order of 32×32 $\mu m^2$ for today's complementary metal-oxide-semiconductor (CMOS) technologies, if a memristor element is utilized as the integrating device instead of a capacitor to mimic the neuron membrane. This neuron circuit implementation may result in the area cost of approximately 10 $mm^2$ for all neurons within the neuro-processor chip 202.

Typically, there may be about 100 synapses per neuron, which may correspond to approximately $10^6$ synapses for the exemplary processor comprising $10^4$ neuron circuits. The implementation area per synapse may be in the order of 10×10 $\mu m^2$ for today's CMOS technologies, if each synapse is implemented based on the nanometer feature-sized memristor element. This may result into the area cost of approximately 100 $mm^2$ for all synapses within the exemplary neuro-processor 202 comprising $10^4$ neuron circuits. Therefore, a total die area of the neuro-processor chip 202 may be approximately equal to 110 $mm^2$ (e.g., the die area of 10.5 mm×10.5 mm).

The fastest firing rate of a neuron may be equal to one spike per 5 ms. The maximum of about 10% of all neurons (or approximately 1000 neuron circuits in this exemplary case) may spike simultaneously in any given 5 ms time period. Therefore, the maximum of $10^5$ synaptic weights may need to be read every 5 ms from the synaptic weight memory 206 through the interface 204 into the neuro-processor 202. In other words, one synaptic weight may need to be read every 50 ns, if only one synaptic weight at a time may be loaded from the external memory 206 to the neuro-processor 202.

On the other hand, a memory write time may be determined based on the number of eligible synapses that may need to be updated when a reward signal arrives. In the worst-case scenario, the memory write time may be equal to a memory read time. As aforementioned, the synaptic memory chip 206 may be typically required to store approximately $10^6$ synaptic weights. If, for example, six bits are utilized per synaptic weight, then a total storage capacity of 6 Mbits may be required.

Magneto-resistive Random Access Memory (MRAM) and the Resistive Random Access Memory (RRAM) represent today's fastest non-volatile memories. These memories may allow read/write times of less than 10 ns and capacities greater than 6 or 10 MBits, which make them suitable for use as external synaptic weight memories.

Figure 4:
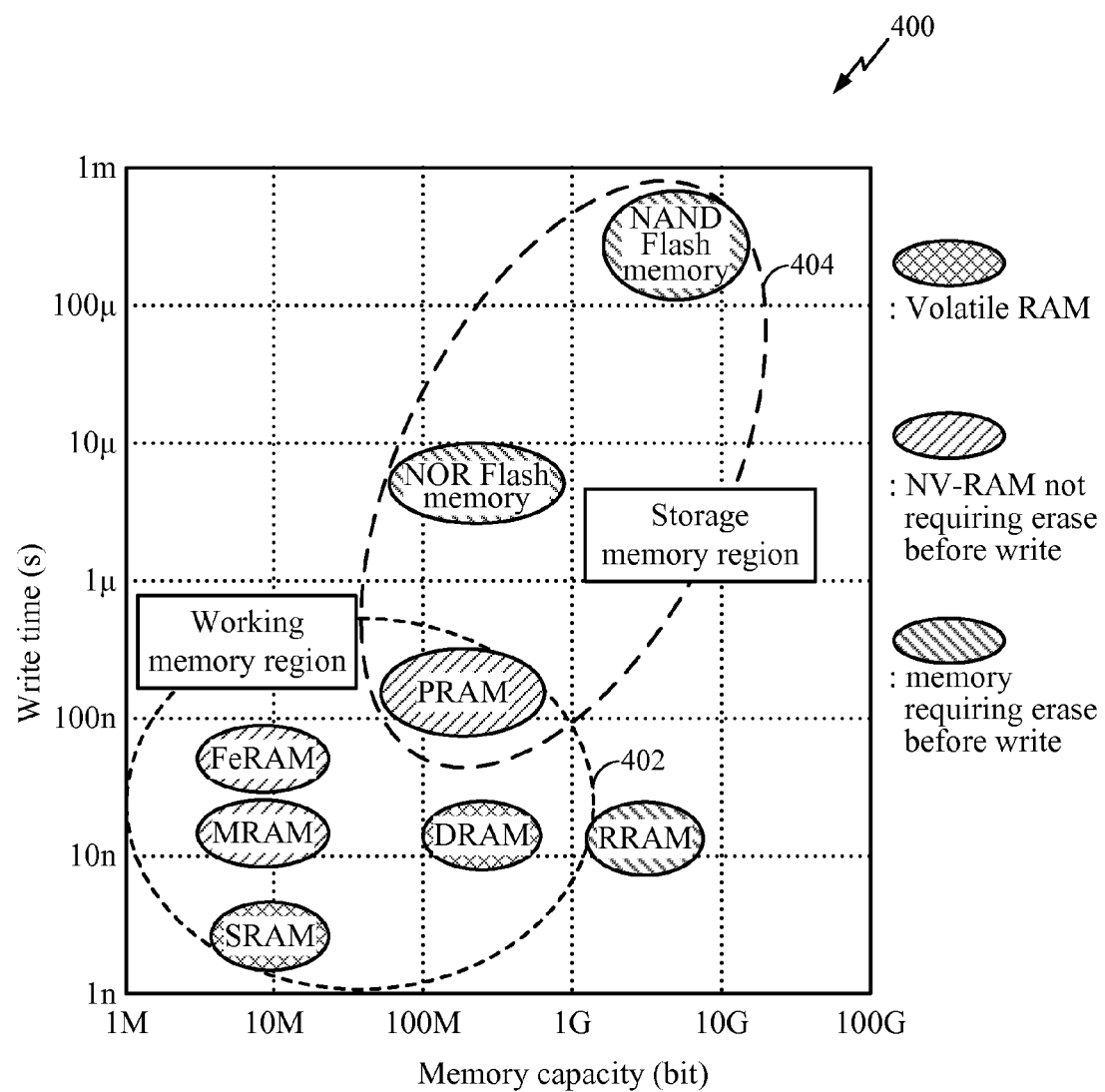
FIG. 4 illustrates examples of non-volatile memories that may be used for implementing the external synaptic weight memory in accordance with certain embodiments of the present disclosure.

FIG. 4 illustrates a graph 400 with examples of non-volatile memories that may be used for the external synaptic memory 206 in accordance with certain embodiments of the present disclosure. Wide choices of non-volatile memory types include flash, ferroelectric, magnetic tunnel junction, spin-transfer torque devices, phase change memories, resistive/memristive switches, and so on. All these choices may represent possible candidates for the external synaptic memory 206.

A portion 402 of the graph 400 may correspond to an operational region of a local working on-chip memory, which may store a portion of synaptic weights for faster processor operations. It can be observed from FIG. 4 that a Ferroelectric Random Access Memory (FeRAM), a Magneto-resistive Random Access Memory (MRAM), a Static Random Access Memory (SRAM), a Dynamic Random Access Memory (DRAM) and a Phase-change Random Access Memory (PRAM) may represent possible candidates for the working on-chip memory. On the other hand, as illustrated in FIG. 4, a Resistive Random Access Memory (RRAM) may be too large and expensive to be utilized as the local on-chip working memory.

It should be noted that PRAM, FeRAM and MRAM memories are all non-volatile memories that do not require data to be erased before writing operations. However, the RRAM memory is the non-volatile memory that requires erasing before writing operation. On the other hand, DRAM and SRAM represent examples of volatile memories.

A portion 404 of the graph 400 may correspond to an operational region of an external memory for storing all synaptic weights associated with an application executed by a neuro-processor interfaced with the external memory. It can be observed from FIG. 4 that a NAND flash memory, a NOR flesh memory and a PRAM may be possible choices for the external synaptic memory. While the NAND flash memories and NOR flesh memories are non-volatile memories that may require data to be erased before writing, the PRAM is the example of non-volatile RAM that does not require erasing before writing.

Figure 3A:
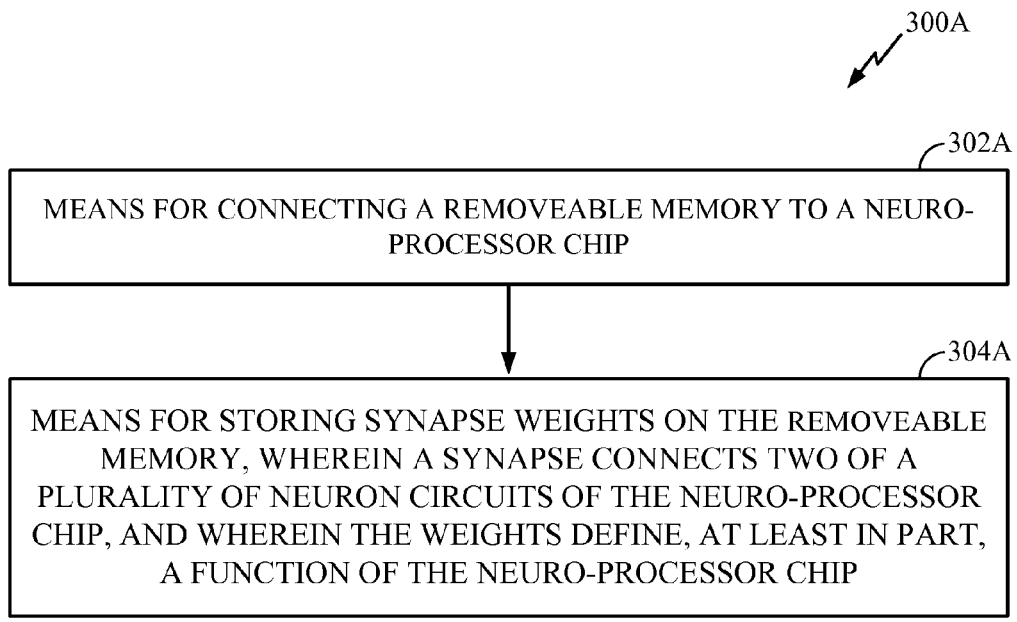
FIG. 3A illustrates example components capable of performing the operations illustrated in FIG. 3.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 300 illustrated in FIG. 3 correspond to components 300A, 302A and 304A illustrated in FIG. 3A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain embodiments may comprise a computer program product for performing the operations presented herein. For example, such a computer program product may comprise a computer readable medium having instructions stored (and/or encoded) thereon, the instructions being executable by one or more processors to perform the operations described herein. For certain embodiments, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. An electrical circuit, comprising:
    a neuro-processor chip with a plurality of neuron circuits and at least one synapse, wherein the at least one synapse connects a pair of neuron circuits;
    a non-volatile removable memory connected to the neuro-processor chip storing weights of the at least one synapse, wherein the weights define, at least in part, a function of the neuro-processor chip, wherein the weights are trained for the pair of neuron circuits before being stored in the non-volatile removable memory, values of the trained weights are replicated and stored in another non-volatile removable memory connected to another neuro-processor chip, and the other neuro-processor chip executes the function of the neuro-processor chip based at least in part on the values of the weights, wherein the non-volatile removable memory is connected to the neuro-processor chip via an interface circuit separate from the removable memory; and
    wherein, the non-volatile removable memory is replaced with a second another non-volatile removable memory that stores different values of the weights than the removable memory, and the different values of the weights define, at least in part, another function of the neuro-processor chip.

2. The electrical circuit of claim 1, wherein
    the interface circuit carries the weights from the neuro-processor chip to the non-volatile removable memory and from the non-volatile removable memory to the neuro-processor chip.

3. The electrical circuit of claim 1, wherein the neuro-processor chip comprises a local memory for storing at least a portion of the weights.

4. A method for implementing a neural system, comprising:
    connecting a non-volatile removable memory to a neuro-processor chip;
    training synapse weights for two neuron circuits of a plurality of neuron circuits of the neuro-processor chip;
    storing the trained synapse weights on the non-volatile removable memory, wherein a synapse connects the two of the plurality of neuron circuits of the neuro-processor chip, and wherein the weights define, at least in part, a function of the neuro-processor chip;
    connecting the non-volatile removable memory to the neuro-processor chip using an interface circuit separate from the non-volatile removable memory;
    replicating values of the trained synapse weights to another non-volatile removable memory connected to another neuro-processor chip, wherein the other neuro-processor chip executes the function of the neuro-processor chip based at least in part on the values of the weights; and replacing the non-volatile removable memory with a second another non-volatile removable memory that stores different values of the weights than the non-volatile removable memory, wherein the different values of the weights define, at least in part, another function of the neuro-processor chip.

5. The method of claim 4, further comprising:

transferring the weights from the neuro-processor chip to the non-volatile removable memory, and from the non-volatile removable memory to the neuro-processor chip, via the interface circuit.

6. The method of claim 4, further comprising:

storing at least a portion of the synapse weights on a local memory within the neuro-processor chip.

7. An apparatus for implementing a neural system, comprising:

means for connecting a non-volatile removable memory to a neuro-processor chip;

means for training synapse weights for two neuron circuits of a plurality of neuron circuits of the neuro-processor chip;

means for storing the trained synapse weights on the non-volatile removable memory, wherein a synapse connects the two of the plurality of neuron circuits of the neuro-processor chip, and wherein the weights define, at least in part, a function of the neuro-processor chip;

means for connecting the non-volatile removable memory to the neuro-processor chip using an interface circuit separate from the non-volatile removable memory;

means for replicating values of the trained weights to another non-volatile removable memory connected to another neuro-processor chip, wherein the other neuro-processor chip executes the function of the neuro-processor chip based at least in part on the values of the weights; and means for replacing the non-volatile removable memory with a second another non-volatile removable memory that stores different values of the weights than the non-volatile removable memory, wherein the different values of the weights define, at least in part, another function of the neuro-processor chip.

8. The apparatus of claim 7, further comprising:

means for transferring the weights from the neuro-processor chip to the non-volatile removable memory, and from the non-volatile removable memory to the neuro-processor chip, via the interface circuit.

9. The apparatus of claim 7, further comprising:

means for storing at least a portion of the synapse weights on a local memory within the neuro-processor chip.

10. A computer program product for implementing a neural system, comprising a non-transitory computer-readable medium comprising code for:

interfacing a non-volatile removable memory to a neuro-processor chip;

training weights for two neuron circuits of a plurality of neuron circuits of the neuro-processor chip;

storing the trained synapse weights on the non-volatile removable memory, wherein a synapse connects the two of the plurality of neuron circuits of the neuro-processor chip, and wherein the weights define, at least in part, a function of the neuro-processor chip;

connecting the non-volatile removable memory to the neuro-processor chip via an interface circuit separate from the removable memory;

replicating values of the trained weights to another non-volatile removable memory connected to another neuro-processor chip, wherein the other neuro-processor chip executes the function of the neuro-processor chip based at least in part on the values of the weights; and replacing the non-volatile removable memory with a second another non-volatile removable memory that stores different values of the weights than the non-volatile removable memory, wherein the different values of the weights define, at least in part, another function of the neuro-processor chip.

11. The computer program product of claim 10, wherein the computer-readable medium further comprises code for:

transferring the weights from the neuro-processor chip to the non-volatile removable memory, and from the non-volatile removable memory to the neuro-processor chip, via the interface circuit.

12. The computer program product of claim 10, wherein the computer-readable medium further comprises code for:

storing at least a portion of the synapse weights on a local memory within the neuro-processor chip.

* * * * *